United States Patent
Shigeoka

(10) Patent No.: US 7,497,631 B2
(45) Date of Patent: Mar. 3, 2009

(54) BEARING APPARATUS FOR A WHEEL OF VEHICLE

(75) Inventor: Kazuhisa Shigeoka, Shizuoka-ken (JP)

(73) Assignee: NTN Corporation (JP)

( * ) Notice: Subject to any disclaimer, the term of this patent is extended or adjusted under 35 U.S.C. 154(b) by 276 days.

(21) Appl. No.: 11/431,222

(22) Filed: May 10, 2006

(65) Prior Publication Data
US 2006/0257063 A1 Nov. 16, 2006

(30) Foreign Application Priority Data
May 10, 2005 (JP) ............................. 2005-136848

(51) Int. Cl.
F16C 13/02 (2006.01)
(52) U.S. Cl. ...................... 384/544; 384/537
(58) Field of Classification Search .............. 384/513, 384/537, 543–544, 585, 589, 625; 29/894.061, 29/898.062, 898.07, 898.362
See application file for complete search history.

(56) References Cited
U.S. PATENT DOCUMENTS

| | | | | |
|---|---|---|---|---|
| 5,822,859 A | * | 10/1998 | Kessen et al. | 29/898.061 |
| 6,113,279 A | * | 9/2000 | Sawai et al. | 384/537 |
| 6,280,096 B1 | * | 8/2001 | Miyazaki et al. | 384/544 |
| 6,761,486 B2 | * | 7/2004 | Miyazaki et al. | 384/544 |
| 6,782,622 B2 | * | 8/2004 | Hagiwara et al. | 29/894.362 |
| 2003/0103705 A1 | * | 6/2003 | Miyazaki et al. | 384/544 |

FOREIGN PATENT DOCUMENTS

| | | |
|---|---|---|
| DE | 10305084 A1 * | 8/2003 |
| JP | 11-129703 | 5/1999 |
| JP | 2003056570 A * | 2/2003 |
| WO | WO 2004101295 A1 * | 11/2004 |

* cited by examiner

Primary Examiner—Marcus Charles
(74) Attorney, Agent, or Firm—Harness, Dickey & Pierce, P.L.C.

(57) ABSTRACT

A vehicle wheel bearing apparatus has an outer member with an integrally formed mounting body mounting flange and double row outer raceway surfaces formed on its inner circumferential surface. An inner member includes a wheel hub with an integrally formed wheel mounting flange at one end. One inner raceway surface is formed on the outer circumferential surface of the wheel hub. An inner ring is fit onto a cylindrical portion of the wheel hub. One end of the inner ring abuts a shoulder on the wheel hub. The inner ring is formed with the other inner raceway surface on its outer circumferential surface. Double row rolling elements are freely rollably contained, via a cage, between the inner and outer raceway surfaces, respectively, of the inner and outer members. A corner, between the shoulders of the wheel hub and the cylindrical portion, is defined by a compound curve.

6 Claims, 3 Drawing Sheets

BEARING APPARATUS FOR A WHEEL OF VEHICLE

CROSS-REFERENCE TO RELATED APPLICATION

This application claims priority to Japanese Patent Application No. 2005-136848, filed May 10, 2005, which application is herein expressly incorporated by reference.

FIELD

The present disclosure relates to a vehicle wheel bearing apparatus for rotatably supporting a wheel of a vehicle relative to a suspension system and, more particularly, to a vehicle wheel bearing apparatus intended to improve the durability of a wheel hub of a third generation type bearing apparatus where an inner ring is press-fit onto a cylindrical portion of the wheel hub.

BACKGROUND

There are two types of vehicle wheel bearing apparatus, those for a driving wheel and those for a driven wheel. Improvements have been achieved by the reduction of manufacturing cost and the reduction of size and weight to improve fuel consumption. One representative example of such a bearing apparatus of the prior art is shown in FIG. 4.

The vehicle wheel bearing apparatus of FIG. 4 is a so-called third generation type and has a wheel hub 51, an inner ring 52, an outer ring 53, and double row rolling elements 54, 54. The wheel hub 51 has an integrally formed wheel mounting flange 55 to mount a wheel (not shown) at one end. An inner raceway surface 51a is formed on the outer circumferential surface of the wheel hub 51. Also, a cylindrical portion 51b axially extends from the inner raceway surface 51a. Hub bolts 56, to secure the wheel on the flange 55, are equidistantly arranged along the periphery of the flange 55.

The inner ring 52 is press-fit onto the cylindrical portion 51b of the wheel hub 51. The inner ring 52 is formed with an inner raceway surface 52a on its outer circumferential surface. A caulked portion 51c prevents the inner ring 52 from axially slipping off from the cylindrical portion 51b of the wheel hub 51. The caulked portion 51c is formed by radially outwardly deforming the end of the cylindrical portion 51b of the wheel hub 51.

The outer ring 53 has an integrally formed body mounting flange 53b to be mounted on a suspension system (not shown). Double row outer raceway surfaces 53a, 53a are formed on its inner circumferential surface. The double row rolling elements 54 are freely rollably contained between the double row outer raceway surface 53a, 53a and the inner raceway surfaces 51a, 52a, which are arranged opposite to the outer raceway surfaces 53a, 53a.

The wheel hub 51 is formed by carbon steel which includes carbon of 0.40~0.80% by weight. The wheel hub 51 is hardened by high frequency induction hardening over a surface region (shown by cross-hatching) from a base of the wheel mounting flange 55 to the cylindrical portion 51b. The caulked portion 51c remains as a non-hardened portion after forging. On the other hand, the inner ring 52 is made of high carbon chrome bearing steel, such as SUJ 2, and is hardened to its core by dip quenching.

Thus, it is possible to realize a vehicle wheel bearing apparatus with a low manufacturing cost, has sufficient durability, and prevents the generation of cracks in the caulked portion 51c. Also, the bearing apparatus prevents the diameter of the inner ring 52, secured by the caulked portion 51c, from being deformed to an extent that causes practical problems. In addition, it is possible to prevent the generation of damages in the inner ring 52, such as cracks during its caulking operation, to keep the pre-load at its proper value. This also reduces the manufacturing cost by reducing the number of parts and the number of manufacturing steps (see Japanese Laid-open Patent Publication No. 129703/1999).

In such a vehicle wheel bearing apparatus of the prior art, a corner "A" (FIG. 5), which is a region that remains in a vacant space when the inner ring 52 is press-fit on the cylindrical portion 51b of the wheel hub 51, is formed by a single radius of curvature, a circular arc. In the vehicle wheel bearing apparatus although it is required to reduce its size to reduce its weight, it is necessary to increase a length "X" (a contacting area) of the abutted region between the end face 52b of the inner ring 52 and the shoulder of the cylindrical portion 51b in order to assure the rigidity of the inner ring 52. However, if the length "X" is increased, the corner "A" will be excessively reduced. Thus, an excessively large stress will be caused in the corner. Accordingly, the mechanical strength of the wheel hub 51 would be extremely reduced especially when a bending moment is repeatedly applied to the bearing apparatus.

An interference problem is caused between the corner "A" and a chamfered portion 52c of the inner ring 52 when the radius of curvature of the single radius is increased in order to reduce the stress caused in the corner "A". The interference between the corner "A" and the chamfered portion 52c of the inner ring 52 causes misalignment and thus reduces the durability of the inner ring 52. Accordingly, dimensional variation or dispersion should be strictly reduced when machining the corner "A". However, the strict reduction of the dimensional variation leads to a higher manufacturing cost or expense and thus, its degree is limited. Accordingly, it has been a problem to suppress the stress caused in the corner "A" under heavy duty circumstances.

SUMMARY

It is an object of the present disclosure to provide a third generation type vehicle wheel bearing apparatus where the stress caused in the corner of the cylindrical portion of the wheel hub, near a region where the inner ring abuts the wheel hub, is suppressed and thus greatly increases the durability of the wheel hub.

According to the present disclosure, a vehicle wheel bearing apparatus comprises an outer member having an integrally formed body mounting flange and double row outer raceway surfaces formed on its inner circumferential surface. An inner member includes a wheel hub with an integrally formed wheel mounting flange at one end. One inner raceway surface is formed on the outer circumferential surface of the wheel hub. The inner raceway surface is opposite to one of the double row outer raceway surfaces. A cylindrical portion of the wheel hub axially extends from the inner raceway surface through a shoulder. An inner ring is fit onto the cylindrical portion of the wheel hub. One end of the inner ring abuts the shoulder of the wheel hub. The other inner raceway surface is formed on the outer circumferential surface of the inner ring. The other inner raceway surface is opposite to the other outer raceway surface of the double row outer raceway surfaces. Double row rolling elements are freely rollably contained, via a cage, between the inner and outer raceway surfaces, respectively, of the inner and outer members. A corner, between the shoulder of the wheel hub, and the cylindrical portion, is defined by a compound curve comprising a plurality of radii of curvatures.

According to the third generation type vehicle wheel bearing apparatus, since the corner between the shoulder of the wheel hub and the cylindrical portion is defined by a compound curve comprised of a plurality of radii of curvatures, it is possible to provide a bearing apparatus which can increase the rigidity of the inner ring. This occurs by assuring a sufficient contact area between the shoulder of the wheel hub and the end of the inner ring within a limited space. This improves the durability of the wheel hub by suppressing stress generated in the corner.

The compound curve comprises two radii of curvatures "b" and "c". One radius of curvature "b" is smaller than a single curve radius of curvature "a" which is a maximum radius of curvature for forming the corner by a single curve. The other radius of curvature "c" is larger than the single curve radius of curvature "a". A relationship exists between them as "b<a<c". This enables the prevention of interference between the corner and the chamfered portion of the inner ring. Also, this reduces the manufacturing cost without suppressing the dimensional variation to a great degree.

The compound curve forming the corner portion is formed by simultaneously grinding the inner raceway surface of the wheel hub and the shoulder after high frequency induction hardening of the corner. This makes it possible to carry out high accuracy machining of the corner without influence of thermal deformation due to heat treatment and to limit a joint gap, (amount of pre-load) within the bearing, to a desirable range.

The inner ring is secured in an axial direction relative to the wheel hub by a caulked portion formed by radially outwardly deforming the end of the cylindrical portion of the wheel hub. This makes it possible to provide a self-retaining structure which can keep the proper pre-load of the bearing for a long term.

The wheel hub is formed by medium carbon steel including carbon of 0.40~0.80% by weight. The wheel hub is hardened by high frequency induction hardening over a region from a base of the wheel mounting flange to the cylindrical portion. It has a surface hardness of 58~64 HRC. The caulked portion remains as a non-hardened portion and has a surface hardness of 25 HRC or less after forging. This enables an improvement to the strength of the wheel hub and to the durability of the bearing since the fretting wear at the fitted surface of the inner ring is reduced. In addition, it is possible to improve the workability of the caulked portion and to prevent the generation of cracks due to plastic deformation of that portion.

According to the present disclosure, a vehicle wheel bearing apparatus comprises an outer member with an integrally formed body mounting flange and double row outer raceway surfaces formed on its inner circumferential surface. An inner member includes a wheel hub with an integrally formed wheel mounting flange at one end. One inner raceway surface is formed on the outer circumferential surface of the wheel hub opposite to one of the double row outer raceway surfaces. A cylindrical portion axially extends from the inner raceway surface through a shoulder. An inner ring is fitted on the cylindrical portion. One end of the inner ring abuts the shoulder of the wheel hub. The other inner raceway surface is formed on the outer circumferential surface of the inner ring. The other inner raceway surface is opposite to the other outer raceway surface of the double row outer raceway surfaces. Double row rolling elements are freely rollably contained, via a cage, between the inner and outer raceway surfaces, respectively, of the inner and outer members. A corner between the shoulder of the wheel hub and the cylindrical portion is defined by a compound curve which comprises a plurality of radii of curvatures.

A vehicle wheel bearing apparatus comprises an outer member with an integrally formed body mounting flange and double row outer raceway surfaces formed on its inner circumferential surface. An inner member has a wheel hub with an integrally formed wheel mounting flange at one end. One inner raceway surface is formed on the outer circumferential surface of the wheel hub opposite to one of the double row outer raceway surfaces. A cylindrical portion axially extends from the inner raceway surface through a shoulder. Also, an inner ring is fitted onto the cylindrical portion. One end of the inner ring abuts the shoulder of the wheel hub. The other inner raceway surface is formed on the outer circumferential surface of the inner ring. The other inner raceway surface is opposite to the other outer raceway surface of the double row outer raceway surfaces. Double row rolling elements are freely rollably contained, via a cage, between the inner and outer raceway surfaces, respectively, of the inner and outer members. A corner between the shoulder of the wheel hub and the cylindrical portion is defined by a compound curve which comprises a plurality of radii of curvatures.

Further areas of applicability will become apparent from the description provided herein. It should be understood that the description and specific examples are intended for purposes of illustration only and are not intended to limit the scope of the present disclosure.

DRAWINGS

Additional advantages and features of the present disclosure will become apparent from the subsequent description and the appended claims, taken in conjunction with the accompanying drawings, wherein:

DETAILED DESCRIPTION

The following description is merely exemplary in nature and is not intended to limit the present disclosure, application, or uses.

Figure 1:
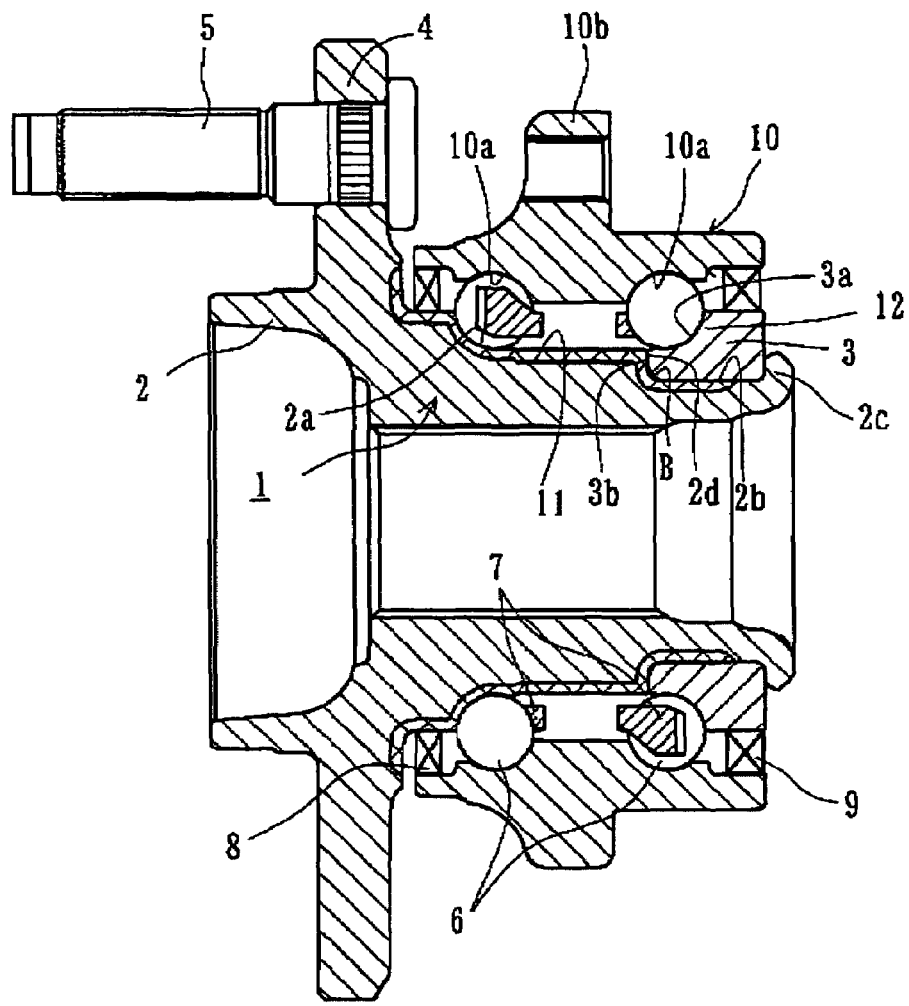
FIG. 1 is a longitudinal section view of a first embodiment of the wheel bearing apparatus.

FIG. 1 shows a first embodiment of a vehicle wheel bearing apparatus. In the description below, the term "outboard side" of the apparatus denotes a side which is positioned outside of the vehicle body. The term "inboard side" of the apparatus denotes a side which is positioned inside of the body when the bearing apparatus is mounted on the vehicle body.

The illustrated bearing apparatus is used for a driving wheel of a vehicle of the third generation type. The bearing and apparatus includes an inner member 1, an outer member 10 and double row rolling elements (balls) 6, 6 freely rollably contained between the inner and outer members 1, 10. The inner member 1 includes a wheel hub 2 and an inner ring 3 press-fit onto the wheel hub 2 via a predetermined interface.

The wheel hub 2 is integrally formed with a wheel mounting flange 4, for mounting a wheel (not shown) on its outer peripheral surface, at the end of outboard side. Hub bolts 5, to secure the wheel on the flange 4, are equidistantly arranged along the periphery of the flange 4. The wheel hub 2 is also formed with one inner raceway surface (i.e. inner raceway surface of the outboard side) 2a on its outer circumferential surface. A cylindrical portion 2b axially extends from the inner raceway surface 2a through a shoulder 2d. The inner ring 3 is fitted onto the cylindrical portion 2b with one end abutting the shoulder 2d of the wheel hub 2. The inner ring 3 is also formed with the other inner raceway surface 3b on its outer circumferential surface. The other inner raceway surface 3b is opposite to the other outer raceway surface 10a of the double row outer raceway surfaces 10a, 10a. The inner ring 3 is secured in an axial direction relative to the wheel hub 2 by a caulked portion 2c. The caulked portion 2c is formed by radially outwardly deforming the end of the cylindrical portion 2b of the wheel hub 2. This makes it possible to provide a self-retaining structure which can keep the proper pre-load of the bearing for a long term.

The outer member 10 is integrally formed with a body mounting flange 10b on its outer circumferential surface. Double row outer raceway surfaces 10a, 10a are also formed on an inner circumferential surface on the outer member 10. Double row rolling elements 6, 6 are freely rollably held, by a cage 7, between the outer and inner raceway surfaces 10a, 10a; 2a, 3a. Seals 8, 9 are arranged at the ends of the outer member 10 to prevent leakage of lubricating grease contained within the bearing as well as ingress of rain water or dusts from outside.

The outer member is made of medium carbon steel (carbon steel for machine structural use of SC family of JIS) including carbon of 0.40~0.80% by weight, such as S53C. The double row outer raceway surfaces 10a, 10a are hardened by high frequency induction quenching to have a surface hardness of 58~64 HRC. The inner ring 3 is made of high carbon chrome bearing steel, such as SUJ2. The inner ring 3 is hardened to its core by dip quenching to have a surface hardness of 58~64 HRC.

Similarly to the outer member 10, the wheel hub 2 is made of medium carbon steel including carbon of 0.40~0.80% by weight such as S53C. The wheel hub 2 includes a hardened layer 11 (shown by cross-hatching), formed by high frequency induction hardening having a surface hardness of 58~64 HRC. The hardened layer 11 covers a region including the inner raceway surface 2a of the outboard side, a seal land portion which contacts the seal 8, and the axially extending cylindrical portion 2b. The caulked portion 2c remains as a non-quenched portion with a surface hardness of 25 HRC or less after it is forged. This improves strength of the wheel hub and the durability of the bearing since the fretting wear at the fitted surface of the inner ring is reduced. In addition, it is possible to improve the workability of the caulked portion and to prevent the generation of cracks due to plastic deformation of that portion.

Figure 2:
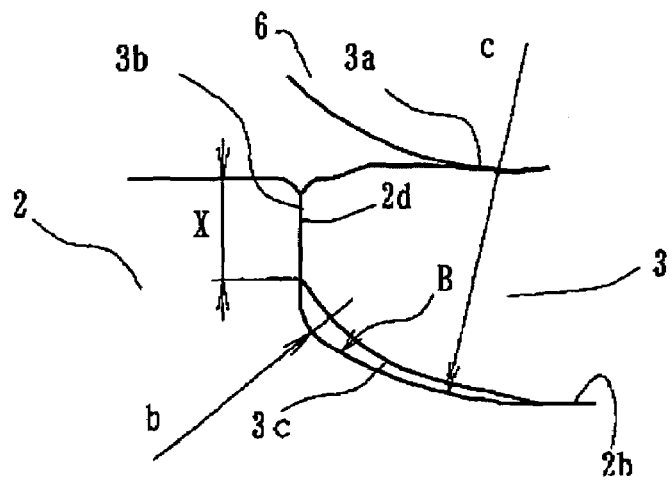
FIG. 2 is an enlarged partial section view of FIG. 1.

As shown in an enlarged view of FIG. 2, a corner "B" between the shoulder 2d of the wheel hub 2 and the cylindrical portion 2b, is defined by a compound curve which includes a plurality of radii of curvatures "b", "c". The compound curve forming the corner "B" is formed by simultaneously grinding the inner raceway surface 2a of the wheel hub 2 and the shoulder 2d after high frequency induction hardening of the corner. This makes it possible to carry out high accuracy machining of the corner "B" without the influence of thermal deformation due to heat treatment and to limit a joint gap, amount of pre-load within the bearing, to a desirable range.

In the plurality of radii of curvature forming the compound curve, one radius of curvature "b" is determined to be smaller than the single curve radius of curvature "a", when the corner "B" is formed by a single radius of curvature. The other radius of curvature "c" is determined to be larger than the single curve radius of curvature "a" (b<a<c). Thus, it is possible to provide the bearing apparatus which can increase the rigidity of the inner ring. This occurs by assuring a sufficient contact area between the shoulder of the wheel hub and the end of the inner ring within a limited space. This improves the durability of the wheel hub by suppressing stress generated in the corner. In addition, it is possible to prevent the interference between the corner and the chamfered portion of the inner ring. This reduces the manufacturing cost without suppressing the dimensional variation.

Table 1 shows results obtained by analyzing stresses generated in the corner "B". In this analysis, the following values were used in Examples 1 and 2; the maximum or single curve radius of curvature "a"=3.5 mm, one of the compound radii of curvatures "b"=2.5 mm, the other of the compound radii of curvatures "c"=8.2 mm (Example 1), and "b"=2.0 mm, "c"=7.6 mm (Example 2). Two kinds of load conditions were used. The side surface of the body mounting flange 10b of the outer member 10 was used as a secured surface. The side surface of the wheel mounting flange 4 of the wheel hub 2 was used as a load supporting surface. As can be clearly appreciated, it is possible to reduce 17~22% the stress generated at the corner "B" when the corner is defined by the compound curvature as compared with stress generated when the corner is defined by the single curvature.

TABLE 1

| Load condition | Comparative example | Example 1 | Example 2 |
| --- | --- | --- | --- |
| 1 | 2038 (1) | 1595 (0.78) | 1616 (0.83) |
| 2 | 2233 (1) | 1747 (0.78) | 1770 (0.83) |

Note:
Unit: MPa, Value in each bracket shows a value of ratio relative to a value 1 of the Comparative example.

Although the illustrated bearing apparatus is of the so-called self-retaining type, where the inner ring 3 is caulked by the cylindrical portion 2b of the wheel hub 2, the present disclosure is not limited to this and can be applied to inner rings simply press-fit onto the cylindrical portion of the wheel hub. In addition, although the illustrated bearing apparatus uses double row angular ball bearing, it is possible to use other bearing, such as a double row tapered roller bearing using tapered rollers as the rolling elements.

Figure 3:
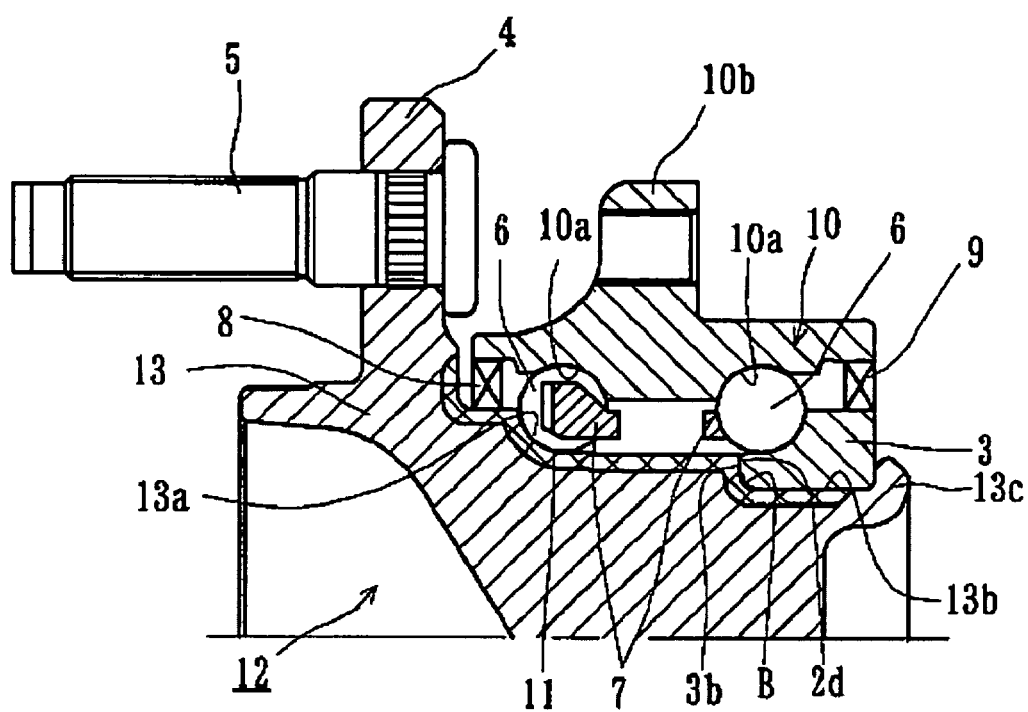
FIG. 3 is a longitudinal section view of a second embodiment of the wheel bearing apparatus.
Figure 4:
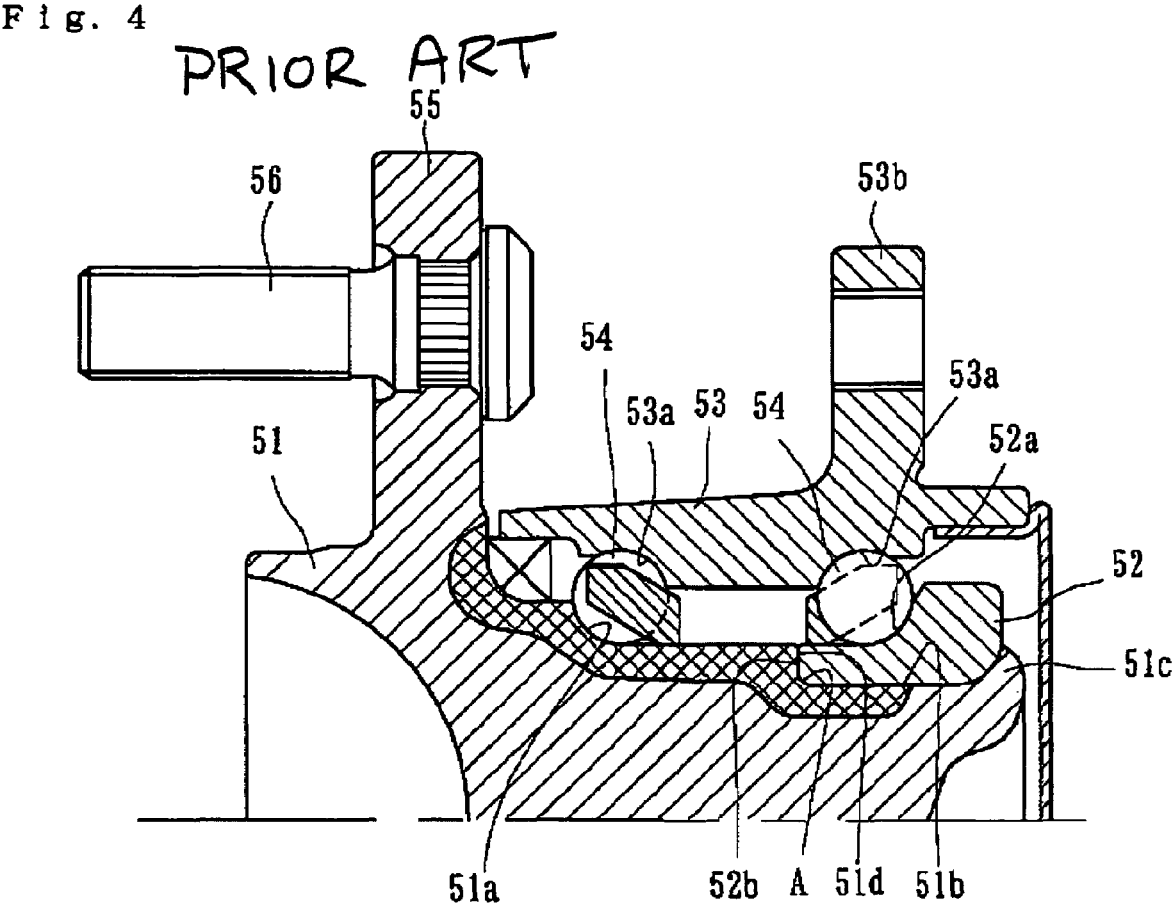
FIG. 4 is a longitudinal section view of a prior art wheel bearing apparatus.
Figure 5:
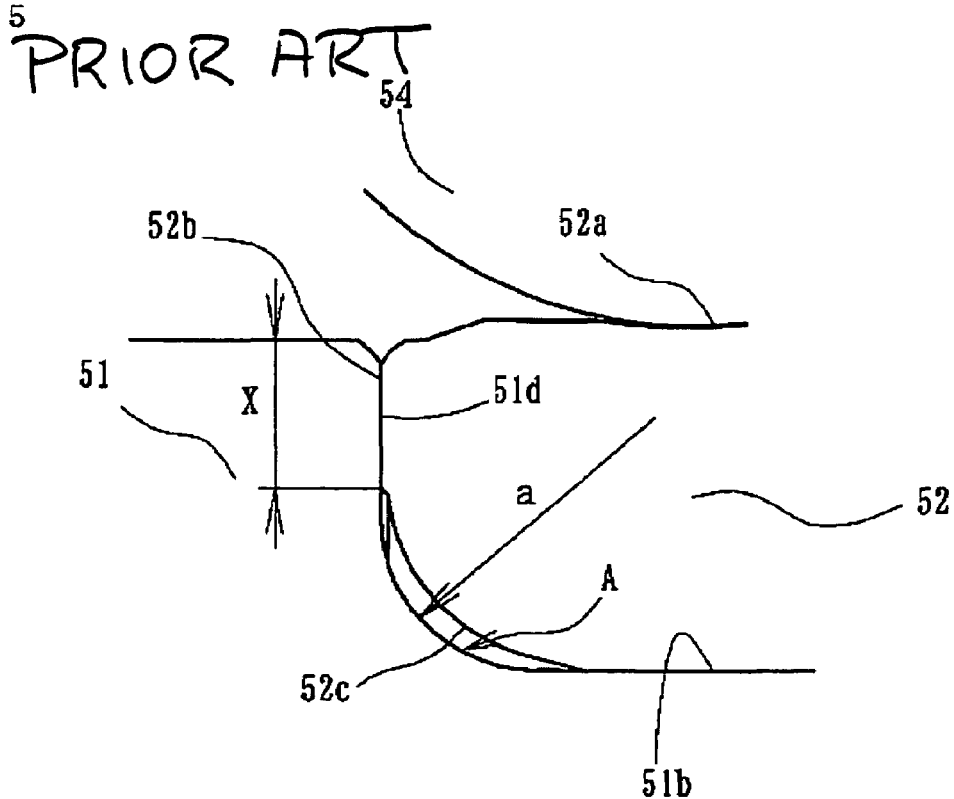
FIG. 5 is an enlarged partial section view of FIG. 4.

FIG. 3 is a longitudinal section view showing a second embodiment of the wheel bearing apparatus applied to a driven wheel of a vehicle. Same reference numerals are used to designate the same parts having the same functions used in the first embodiment.

The illustrated bearing apparatus is that used for a driven wheel of a vehicle of the third generation type. The bearing apparatus includes an inner member 12, an outer member 10 and double row rolling elements (balls) 6, 6 freely rollably contained between the inner and outer members 12, 10. The inner member 12 has a wheel hub 13 and an inner ring 3 press-fit onto the wheel hub 13, via a predetermined interface.

The wheel hub 13 is integrally formed with a wheel mounting flange 4 to mount a wheel (not shown) on its outer peripheral surface at the end of outboard side. The wheel hub 13 is also formed with one inner raceway surface 13a on its outer circumferential surface. A cylindrical portion 13b axially extends from the inner raceway surface 13a. An inner ring 3 is secured in an axial direction relative to the wheel hub 13 by a caulked portion 13c. The caulked portion is formed by radially outwardly deforming the end of the cylindrical portion 13b of the wheel hub 13.

The wheel hub 13 is made of medium carbon steel including carbon of 0.40~0.80% by weight, such as S53C. A hardened layer 11 is formed by high frequency induction hardening (shown by cross-hatching), having surface hardness of 58~64 HRC, at the inner raceway surface 13a of the outboard side, a seal land portion which contacts the seal 8, and the axially extending cylindrical portion 13b. The caulked portion 13c remains as a non-quenched portion having a surface hardness of 25 HRC or less after it is forged.

Similarly to the previously described first embodiment, a corner "B", between the shoulder 2d of the wheel hub 13 and the cylindrical portion 13b, is defined by a compound curve. Thus, it is possible to provide a bearing apparatus which can increase the rigidity of the inner ring. This occurs by assuring a sufficient contact area between the shoulder of the wheel hub and the end of the inner ring within a limited space. This improves the durability of the wheel hub by suppressing the stress generated in the corner.

The vehicle wheel bearing apparatus can be applied to third generation type in where the inner ring is press-fit onto the cylindrical portion of the wheel hub and firmly secured thereon by caulking the end of the cylindrical portion.

The present disclosure has been described with reference to the preferred embodiments. Obviously, modifications and alternations will occur to those of ordinary skill in the art upon reading and understanding the preceding detailed description. It is intended that the present disclosure be construed as including all such alternations and modifications insofar as they come within the scope of the appended claims or their equivalents.

What is claimed is:

1. A bearing apparatus for a wheel of vehicle comprising:
an outer member having an integrally formed body mounting flange and double row outer raceway surfaces formed on an inner circumferential surface;
an inner member including a wheel hub having a wheel mounting flange integrally formed at one end, one inner raceway surface being formed on an outer circumferential surface of the wheel hub opposite to one of the double row outer raceway surfaces, and a cylindrical portion of the wheel hub axially extending from the inner raceway surface through a shoulder, an inner ring fitted onto the cylindrical portion with one end of the inner ring abutting the shoulder of the wheel hub and said inner ring formed with the other inner raceway surface on its outer circumferential surface, said other inner raceway surface opposite to the other outer raceway surface of the double row outer raceway surfaces;
double row rolling elements freely rollably contained, via a cage, between the inner and outer raceway surfaces, respectively, of the inner and outer members; and
a corner between the shoulder of the wheel hub and the cylindrical portion is defined by a compound curve comprising a plurality of radii of curvatures and a radius of curvature of an outboard side is smaller than a radius of curvature of an inboard side of said compound curve.

2. The bearing apparatus for a wheel of a vehicle according to claim 1 wherein the compound curve comprises two radii of curvatures, first radius of curvature being smaller than a single curve radius of curvature which is a maximum radius of curvature for forming the corner by a single curve, second radius of curvature being larger than said single curve radius of curvature, and there being a relation between them as first<single curve<second.

3. The bearing apparatus for a wheel of a vehicle according to claim 1 wherein the compound curve forming the corner is formed by simultaneously grinding the inner raceway surface of the wheel hub and the shoulder after high frequency induction hardening of the corner.

4. The bearing apparatus for a wheel of a vehicle according to claim 1 wherein the inner ring is secured in an axial direction relative to the wheel hub by a caulked portion, said caulked portion formed by radially outwardly deforming the end of the cylindrical portion of the wheel hub.

5. The bearing apparatus for a wheel of a vehicle according to claim 4 wherein the wheel hub is formed by medium carbon steel including carbon of 0.40~0.80% by weight, the wheel hub is hardened by high frequency induction hardening over a region from a base of the wheel mounting flange to the cylindrical portion, said hardening region having surface hardness of 58~64 HRC, and the caulked portion remains as a non-hardened portion having its surface hardness of about 25 HRC or less after forging.

6. The bearing apparatus for a wheel of a vehicle according to claim 1, wherein said compound curve and chamfered portion of said inner ring do not contact one another.

* * * * *